Patented July 25, 1950

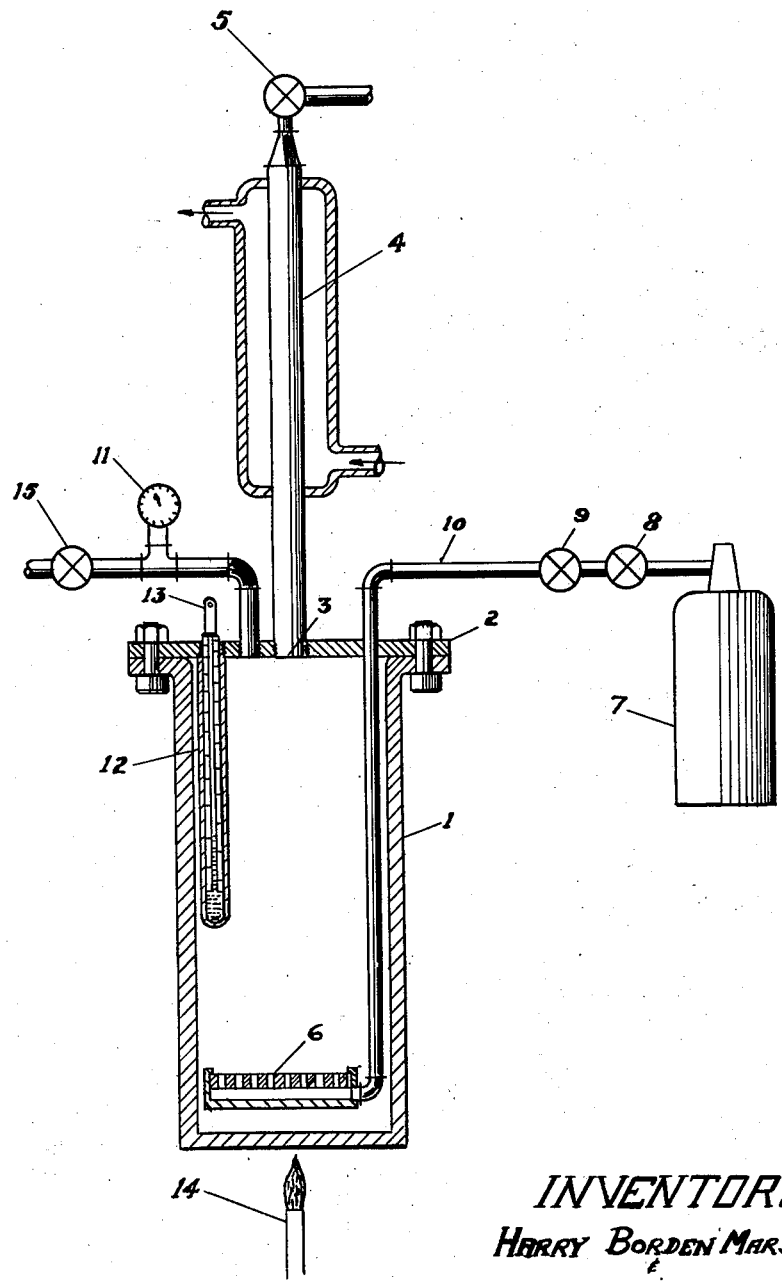

2,516,827

UNITED STATES PATENT OFFICE 2,516,827

METHOD OF PRODUCING VANILLIN

Harry Borden Marshall, Toronto, Ontario, and Charles Alfred Sankey, St. Catharines, Ontario, Canada, assignors to The Ontario Paper Company Limited, Thorold, Ontario, Canada Application July 23, 1945, Serial No. 606,690
In Canada July 9, 1945

5 Claims. (Cl. 252—476)

This invention relates to the production of vanillin from lignin-containing substances and especially from the effluents from acid chemical processes for producing paper pulp, for example, waste sulphite liquor, and to products derived therefrom, as well as effluents from alkaline chemical processes for producing paper pulp, for example residual kraft liquor and residual soda liquor.

It is well known that some vanillin is produced when effluents from acid chemical processes for producing paper pulp are subjected to the action of suitable oxidizing agents especially under alkaline conditions.

We have now discovered a method by which air or oxygen may itself serve as an oxidizing agent to effect the production of vanillin at highly satisfactory yields. We are aware that air or oxygen have previously been used to bring about the production of vanillin from lignin-containing substances under alkaline conditions but, in general the yields obtained have been unsatisfactory, indeed it has even been reported that the yield of vanillin is decreased by the introduction of air into the reaction mixture during the course of vanillin production therefrom.

The essence of our present invention lies in the fact that air or oxygen may be employed to great advantage if it is finely dispersed so as to provide adequate contact with the alkaline lignin-containing liquor under conditions of pressure and temperature which are controlled so as to bring the reaction mixture to a sufficiently high temperature so that the reaction rate is thereby increased and at the same time so that the conditions of oxidation are not rendered sufficiently severe to result in the decomposition of a substantial portion of such vanillin as is formed. We have found that reaction pressures in the range 50–200 lb. per square inch and at temperatures in the range 150°–200° C., at such pressures give highly satisfactory yields of vanillin. Since, in accordance with our invention, the yield of vanillin is also dependent on conditions other than the temperature and pressure in the reaction vessel, the reaction conditions to obtain optimum yields must be selected with additional factors in mind. The time of reaction should be selected having regard to the other conditions so that the reaction is stopped when the vanillin content of the reaction mixture is at or near its maximum; the rate of flow of air or oxygen must be sufficient to promote good agitation and should provide a quantity of oxygen during the reaction period of several times that required to supply 16 grams oxygen (one gram atom oxygen) per 200 grams lignin (approx. one gram molecule of lignin building unit). The concentration of alkali is also important. With alkali concentrations up to 100 grams sodium hydroxide per litre of reaction mixture the vanillin yield increases with increasing concentration. In applying our invention a concentration of alkali will preferably be selected from economic considerations of alkali cost versus vanillin yield.

It will be apparent, therefore, that we have discovered a method by means of which vanillin may be obtained from lignin-containing substances at greatly reduced cost, the only auxiliary chemicals required being alkali and air.

It is well known that certain specific oxidizing agents have been used to obtain vanillin from lignin-containing substances. For example, the use of copper sulphate is well known. We have discovered that by using air or oxygen in accordance with our invention and in addition having present a quantity of such specific oxidizing agents the yield of vanillin may be further increased even when relatively small quantities of such oxidizing agents are present.

Our invention thus permits the use of greatly reduced quantities of such other oxidizing agents and hence effects substantial economies in their use.

We have also discovered that a catalyst may be used to increase the yield of vanillin when our invention is employed.

To prepare a catalyst such as we prefer to employ, copper sulphate may be added to waste sulphite liquor or to the liquor remaining after waste sulphite liquor has been passed through a plant to produce ethyl alcohol, which latter is herein referred to as "alcohol plant effluent" and subjected to an alkaline oxidation with finely divided air or oxygen under pressure in accordance with our present invention. At the conclusion of such oxidation there will be present in the reaction mixture a sludge containing substantially all the copper which was added as copper sulphate. This sludge seems to be composed of a mixture of various copper oxides and possibly metallic copper but its exact composition is not known to us. The said sludge may be removed from the reaction mixture by filtration or centrifuging or any other suitable mechanical means. This sludge without any further chemical treatment is a catalyst which, when added to subsequent reaction mixtures in which air or oxygen is used as a primary oxidizing agent in accordance with our invention, will serve to increase the yield of vanillin therein to a higher value than if such catalyst were not present. The sludge recovered from a subsequent reaction may be reused in a succeeding reaction and so on from reaction to reaction. Its efficiency in such a series of reactions appears to be maintained. We have reused such a catalyst at least five times without diminution of its effect over and above that of a reasonable experimental error in determining the vanillin formed in each case. Such continued reuse is of course contingent on minimizing mechanical loss of catalyst in the cycle.

The figure shows in diagrammatic form an apparatus which we have used in some of our experiments and comprises a bomb 1, into which the reactants are introduced, a cover 2, containing an opening 3, leading to a condensing system 4, in which vapours from the bomb may be condensed and returned thereto by reflux through the opening 3, the condenser system terminating in the control relief valve 5, which limits the maximum pressure in the reaction system to a predetermined value. In the bottom of the bomb 1, is a porous plate 6, beneath which air or oxygen may be introduced and which serves as a gas diffusing means by which air or oxygen enters the reaction zone in a finely dispersed state. The air or oxygen is supplied from a pressure cylinder 7, through valves 8, 9, which control the pressure and rate of discharge from the cylinder into the gas diffusing means by tube 10.

The bomb is also equipped with a pressure gauge 11, and a thermometer well 12, containing a thermometer 13, by means of which the pressure and temperature of the reaction may be noted. The bomb 1, may be heated by any convenient means, for example, a gas flame 14. A relief valve 15, is provided for general pressure reduction.

In all experiments cited in this specification the lignin content of lignin-containing substances was estimated in terms of the methoxyl content thereof. The chemical group $CH_3O$, or methoxyl group, is well known to be a characteristic component part of lignin and is chemically determinable with reasonable accuracy by well-known analytical procedures. It is valid to assume that the lignin of a complex mixture containing lignin is proportional to the methoxyl content thereof.

In our experiments it is assumed that the ratio of methoxyl content to lignin content of any of the mixtures investigated is 15.5 to 100. Such an assumed ratio is in accordance with current good chemical usage in dealing with lignin-containing substances. Whether this assumed ratio is or is not numerically correct is immaterial because the ratio of methoxyl to lignin may be reasonably assumed to be constant for any given lignin-containing substance. The assumption of the above ratio will, therefore, serve for purposes of obtaining a valid relative guide to the quantity of lignin in lignin-containing substances.

Our invention is applicable not only to the production of vanillin from the effluents from acid chemical processes for producing paper pulp as hereinbefore described but also to the production of vanillin from the effluents from alkaline chemical processes for producing paper pulp, such as residual kraft liquor and residual soda liquor. Hitherto the treatment of such alkaline process effluents by oxidation procedures for the production of vanillin has been unsuccessful, only minute quantities of vanillin, if any, being formed. The examples hereinafter supplied will show that by our method commercially satisfactory yields of vanillin may be obtained from such effluents even when no additional alkali is employed.

The following description of experiments which have been performed by us will serve to illustrate the application of our invention. It is to be understood that our invention is not limited to the materials and conditions described in these experiments which are to be considered as examples only. In the majority of the experiments the lignin-containing substance used was alcohol plant effluent. This is a preferred substance to which our invention may be applied.

*Example 1.—Illustrates the use of air as oxidizing agent*

One litre of alcohol plant effluent was heated with 100 grams of caustic soda in the previously described apparatus. Throughout the heating cycle a steady flow of compressed air, sufficient to insure good agitation, was diffused through the liquid, the valve 5 being adjusted to relieve gas at 110 lb. per square inch pressure. No catalyst or special oxidizing agent such as copper sulphate was present. The apparatus was heated sufficiently so that the reactants were subjected to an observed temperature of 169–170° C. The apparatus was maintained under these conditions for three hours. At the conclusion of this treatment the air flow was turned off, the system was cooled to a lower temperature than its boiling point at atmospheric pressure, and the pressure reduced to that of the atmosphere by the relief valve 15. The residual liquor was then analysed for its vanillin content and the latter correlated with the orginal lignin content thereof. A yield of vanillin of 11.5% based on the said lignin content was obtained.

*Example 2.—Illustrating the use of small quantity of copper sulphate hydrate in conjunction with air and also illustrating preparation of catalyst*

One litre of alcohol plant effluent was heated with 100 grams of caustic soda and 16 grams copper sulphate hydrate in the previously described apparatus. As in Example 1, air was dispersed through the reaction zone, with the valve 5 adjusted to relieve gas at 110 lb. per square inch pressure, the reaction time at an observed temperature of 169°–170° C. being three hours. The experiment was concluded with temperature and pressure adjustments as in Example 1 and the reaction mixture removed from the bomb, care being taken to thoroughly wash out a sludge formed therein. This sludge, as hereinbefore stated, is a catalyst in accordance with our invention and was removed from the reaction mixture by centrifuging.

In this experiment a yield of vanillin was obtained equivalent to 14.4% of the original lignin content of the alcohol plant effluent

*Example 3.—Illustrating the use of catalyst in conjunction with air*

One litre of alcohol plant effluent was heated with 100 grams of caustic soda and the catalyst recovered from Example 2. The experiment was conducted in a similar manner to Example 1, the pressure being adjusted to 110 lb. per square inch and the time at 169°–170° C. being three hours. At the conclusion of the experiment the catalyst was recovered from the reaction mixture as in Example 2. In this experiment a yield of vanillin was obtained equivalent to 12.7% of the original lignin content of the alcohol plant effluent.

The catalyst recovered from the above was re-used in a series of experiments in which the conditions of Example 3 were repeated. In this series vanillin yields of 14.8%, 15.6%, 14.2%, and 13.8% vanillin (all based on the lignin content) were obtained on the second, third, fourth, and fifth successive reuse of the catalyst, no additional copper sulphate being added in any experiment of this series.

*Example 4.—Illustrating the use of oxygen as an oxidizing agent*

One litre of alcohol plant effluent was heated with 100 grams of caustic soda and 16 grams of copper sulphate hydrate in the previously described apparatus. Oxygen was dispersed through the reaction zone with the valve 5 adjusted to relieve gas at 70 lb. per square inch pressure. The observed temperature was 151° C. The reaction time under the above conditions was 1½ hours. A yield of vanillin of 12.2% of the lignin content of the above plant effluent was obtained.

*Example 5.—Illustrating the use of waste sulphite liquor*

One litre of waste sulphite liquor was treated as in Example 2.

A yield of vanillin was obtained equivalent to 10.8% of the lignin content thereof.

*Example 6.—Illustrating the use of soda liquor*

One litre of a liquor resulting from the production of pulp by the soda process was heated with 12 grams copper sulphate hydrate in the previously described apparatus, no additional alkali being added. The pressure and reaction time and temperature were as in Example 2.

A yield of vanillin was obtained equivalent to 3.8% of the lignin content thereof.

*Example 7.—Illustrating the use of kraft liquor*

One litre of a liquor resulting from the production of pulp by the kraft process was treated as in Example 6.

A yield of vanillin was obtained equivalent to 3.2% of the lignin content thereof.

*Example 8.—Illustrating the use of wood meal*

60 grams spruce wood meal were added to one litre of a solution containing 100 grams caustic soda and sixteen grams copper sulphate hydrate and subjected to the oxidation procedure similarly to Example 2. A vanillin yield corresponding to 13.7% of the lignin content of the wood meal was obtained.

*Example 9.—Illustrating the combined effect of pressure - temperature and reaction time on vanillin yield*

A series of experiments were carried out with a single sample of alcohol plant effluent, with alkali and copper sulphate hydrate as in Example 2 and with constant air flow. The pressure was adjusted to give a series of increasing pressures, the corresponding temperatures being noted in each case. The reaction mixture was maintained for three hours under the stated conditions. Vanillin yields were obtained as follows:

| Relief Pressure | Temperature Observed | Vanillin Yield |
|---|---|---|
| Lb./sq. in. | °C. | Per cent |
| 50 | 142 | 11.2 |
| 80 | 158 | 13.7 |
| 110–115 | 169 | 14.9 |
| 130–140 | 175 | 13.5 |
| 170 | 183 | 12.1 |
| 200 | 189 | 12.0 |

In another similar series of a different alcohol plant effluent the maximum yield for a two-hour reaction time was with the pressure of 170 lb. per sq. in. and at an observed temperature of 182° C. at which a 13.5% yield of vanillin was obtained.

*Example 10.—Illustrating the effect of rate of air flow*

Employing conditions similar to example 2 with a 3 hr. reaction time and pressure at 110–115 lb./sq. in. and using 100 grams caustic soda, three experiments were performed in which the rates of air flow were respectively 3.3, 6.9, and 13.4 cu. ft. per hour. The vanillin yields obtained were 9.6%, 14.5%, and 14.5% respectively.

*Example 11.—Illustrating the effect of alkali concentration*

Employing conditions similar to Example 2 with a 3 hr. reaction time and pressure at 110–115 lb./sq. in. and with constant air flow, the vanillin yield changed as follows with alkali concentration:

| Alkali concentration caustic soda | Vanillin yield |
|---|---|
| Grams per liter | Per cent |
| 25 | 0.8 |
| 50 | 5.9 |
| 75 | 10.7 |
| 100 | 14.5 |
| 150 | 12.2 |

In the examples cited above it must be noted that the conditions of agitation are dependent on the details of the reaction vessel. It must not be expected therefore that using different reaction vessels and different lignin-containing substances that the above results will hold for all cases. For example, it would be incorrect to assume that a pressure range 110–115 lb. would necessarily always give a maximum vanillin yield for a 3 hr. reaction period. The examples are illustrative of the yields we have obtained by employing our invention and provide a guide as to the effect of variables which will enable others to apply our invention to maximum advantage in their own case.

When in this specification the word "pressure" is used it is to be understood that we refer to gauge pressure and not absolute pressure.

The words "lignin-containing substances" when used herein, have reference to the species of chemical individuals which are present in ligno-cellulose materials and to which the word lignin is applied including derivatives of the same which result from chemical processes for producing wood pulp and are present in the residual liquors from said processes.

The chemical identity and nature of lignin as originally present in ligno-cellulose materials and in the species lignin-containing substances, has not been established. The scope of the term lignin as herein used, may be defined as by Brauns in "Cellulose and its Derivatives," edited by Ott, Interscience Publishers Inc., first edition 1943, page 449, line 7 ff.

What we claim as our invention is:

1. A catalyst which assists in the production of vanillin consisting of the sludge residual in a reaction mixture in which vanillin has been produced by subjecting, to the action of a finely dispersed gas containing free gaseous oxygen, lignin-containing substances in an alkaline medium to which has been added copper sulphate under conditions of temperature in excess of 140° C. and partial pressure of oxygen of less than 20 lb. per sq. in.

2. A method of producing vanillin which consists in subjecting to the action of a finely dispersed gas containing free gaseous oxygen a reaction mixture comprising lignin-containing substances in an alkaline medium to which has been added copper sulphate, separating the residual sludge therefrom, adding said sludge to a reaction mixture containing lignin-containing substances in an alkaline medium and subjecting such combined materials to the action of a finely dispersed gas containing free gaseous oxygen.

3. A method of producing vanillin which consists in subjecting to the action of a finely dispersed gas containing free aqueous oxygen a reaction mixture comprising lignin-containing substances in an alkaline medium to which has been added copper sulphate, separating the residual sludge therefrom, adding said sludge to a reaction mixture containing lignin-containing substances in an alkaline medium and subjecting such combined materials to the action of a finely dispersed gas containing free gaseous oxygen, recovering the sludge from said process and repeatedly reusing said sludge as a catalyst in the production of vanillin according to the said method.

4. A method of producing vanillin according to claim 3 in which the lignin-containing substance consists of waste sulphite liquor.

5. A method of producing vanillin according to claim 3 in which the lignin-containing substance is the effluent from a process in which waste sulphite liquor has been so treated that as a result the fermentable sugar content thereof has been substantially reduced.

HARRY BORDEN MARSHALL.
CHARLES ALFRED SANKEY.

REFERENCES CITED

The following references are of record in the file of this patent:

UNITED STATES PATENTS

| Number | Name | Date |
|---|---|---|
| 2,434,626 | Salvesen | Jan. 13, 1948 |

FOREIGN PATENTS

| Number | Country | Date |
|---|---|---|
| 513,755 | Germany | Dec. 14, 1931 |
| 537,845 | Germany | Dec. 14, 1931 |

OTHER REFERENCES

Ser. No. 318,386, Freudenberg et al. (A. P. C.), pub. April 20, 1943.

Lautsch et. al., "Angewandte Chemie," vol. 53, pages 450–452, September 28, 1940.

Pearl "Jour. Am. Chem. Soc.," vol. 64, pages 1429–1431.